J. S. INGHAM.
CARPET-STRETCHER.
No. 178,060. Patented May 30, 1876.
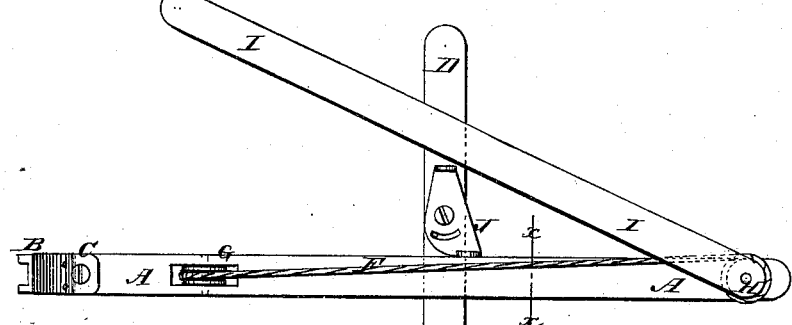
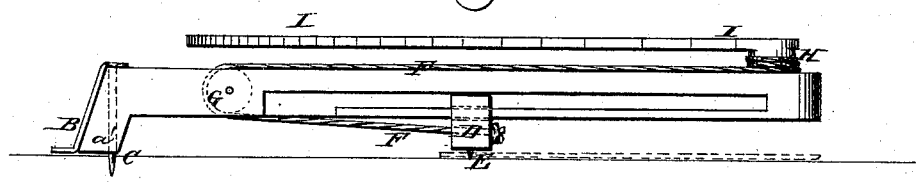
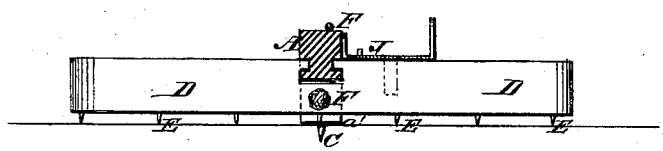

UNITED STATES PATENT OFFICE.

JOSEPH S. INGHAM, OF KNOXVILLE, PENNSYLVANIA.

IMPROVEMENT IN CARPET-STRETCHERS.

Specification forming part of Letters Patent No. 178,060, dated May 30, 1876; application filed January 29, 1876.

*To all whom it may concern:*

Be it known that I, JOSEPH S. INGHAM, of Knoxville, in the county of Tioga and State of Pennsylvania, have invented a new and useful Improvement in Carpet-Stretcher, of which the following is a specification:

Figure 1 is a top view of my improved carpet-stretcher. Fig. 2 is a side view of the same. Fig. 3 is a cross-section of the same, taken through the line *x x*, Fig. 1.

Similar letters of reference indicate corresponding parts.

The object of this invention is to furnish an improved carpet-stretcher, simple in construction and convenient in use.

The invention consists in the combination of the projecting plate and screw or pin with the forward end of the main bar of the carpet-stretcher; in the combination of the pivoted cam or locking-plate with the main bar and the sliding cross-bar of the carpet-stretcher; and in an improved carpet-stretcher, formed by the combination of the main bar, provided with the projecting plate and screw or pin, the sliding cross-bar, provided with the points, the rope, the pulley, the hub or drum, the lever, and the cam or locking-plate, with each other, as hereinafter fully described.

A is the main bar, the forward end of which is inclined, and is made with a downward projection, *a'*. To the forward end of the bar A is attached a plate, B, the lower end of which is bent forward and notched, and is designed to be slipped beneath the lower edge of the base board of the room. Through the forward end of the bar A is passed a screw or pin, C, the point of which projects to enter the floor and keep the stretcher in place while being used. D is a cross-bar, in the upper side of the center of which is formed a T-groove, to fit and slide upon the groove *d* in the lower part of the bar A, as shown in Figs. 2 and 3. To the lower side of the cross-bar D are attached points E, to take hold of the carpet and draw it as the said bar D is slid forward upon the bar A. To the center of the bar D is attached one end of a rope, F, that passes around a pulley, G, pivoted in a slot in the forward part of the bar A. From the pulley G the rope F passes back along the upper side of the bar A, and is attached to a hub or small drum, H, pivoted to the rear end of the said bar A. To the hub or drum H is rigidly attached, or upon it is formed, a lever, I, so that by turning the said lever I the rope F may be wound upon the hub or drum H, drawing the slide D forward and stretching the carpet. To the slide D, at one side of the bar A, is pivoted a plate, J, having a handle formed upon its outer end, and a cam formed upon its inner end, to rest against the side of the bar A and lock the slide D, holding the carpet in place until it has been tacked.

The movement of the cam or locking-plate J is limited by a pin attached to the slide D, and which enters a curved slot in the said plate J.

Having thus described my invention, I claim as new and desire to secure by Letters Patent—

1. The combination, with vertical pin C and bar A, having projection *a'*, of the plate B, bent at an angle at each end, but on opposite sides, one end adapted to be extended under the base-board and the other pinned to the bar A, as and for the purpose specified.

2. The combination of the pivoted cam or locking-plate J with the main bar A and the sliding cross-bar D of the carpet-stretcher, substantially as herein shown and described.

3. An improved carpet-stretcher, formed by the combination of the main bar A, provided with the projecting plate B and screw or pin C, the sliding cross-bar D, provided with the points E, the rope F, the pulley G, the hub or drum H, the lever I, and the cam or locking-plate J, with each other, substantially as herein shown and described.

JOSEPH S. INGHAM.

Witnesses:
A. A. AINSBY,
J. G. PARKHURST.